Feb. 28, 1933.　　F. E. STRATTON　　1,899,362
MACHINE TOOL
Filed May 11, 1931　　2 Sheets-Sheet 1

INVENTOR
Frank E. Stratton
BY Thomas A. Jenches
ATTORNEY

Feb. 28, 1933. F. E. STRATTON 1,899,362
MACHINE TOOL
Filed May 11, 1931   2 Sheets-Sheet 2
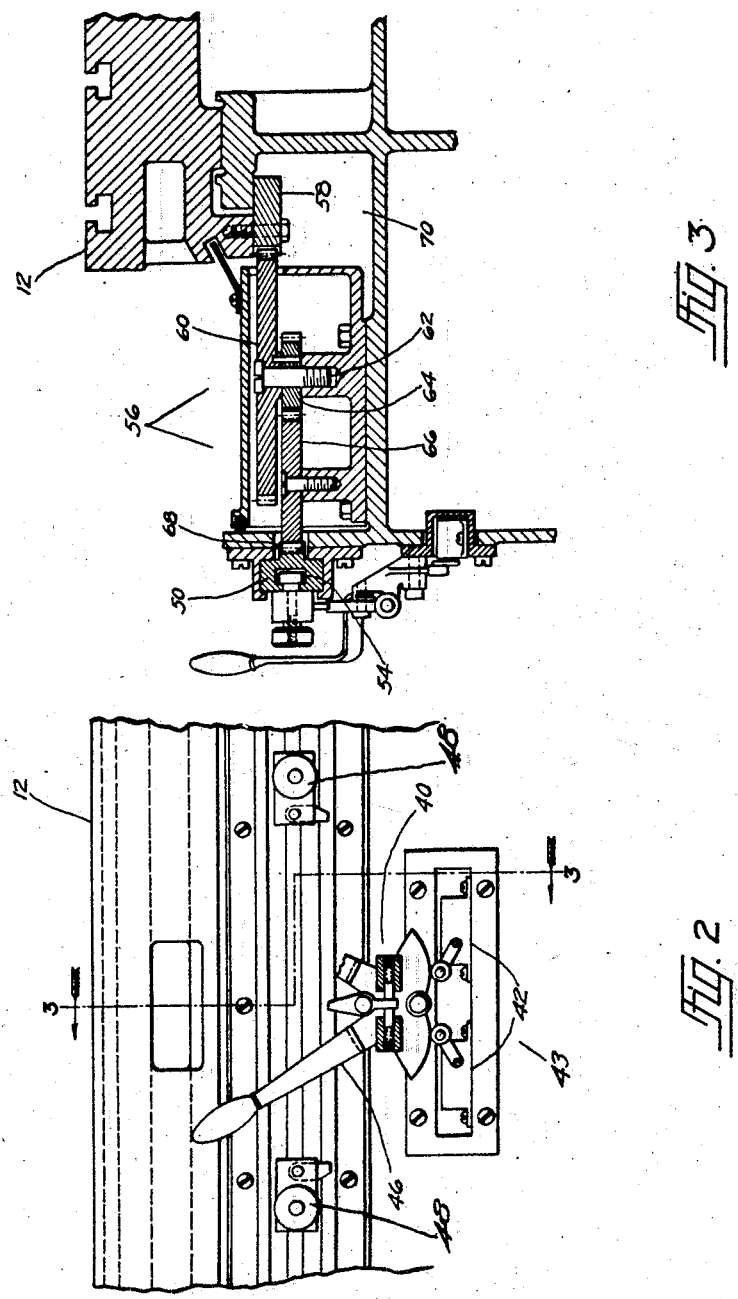
INVENTOR
Frank E. Stratton
BY
Thomas A. Jenkes
ATTORNEY Patented Feb. 28, 1933

1,899,362

UNITED STATES PATENT OFFICE

FRANK E. STRATTON, OF EDGEWOOD, RHODE ISLAND, ASSIGNOR TO DIAMOND MACHINE CO., OF PROVIDENCE, RHODE ISLAND, A CORPORATION OF RHODE ISLAND

MACHINE TOOL

Application filed May 11, 1931. Serial No. 536,539.

My invention relates to improvements in machine tools particularly of the type having a reciprocatable means adapted to be reciprocated substantially the length of the machine tool and a means adapted to function in connection with the reciprocating means. The reciprocation of such a reciprocating means is normally controlled by the position of dogs mounted on the reciprocatable means adapted to contact a trip lever operative on movement in one direction of said reciprocatable means to trip the dog to actuate the reciprocating means for the reciprocatable means to move said reciprocatable means in one direction and operative on tripping thereof by the movement of the reciprocatable means in the opposite direction to actuate the reciprocating means for the reciprocatable means to move said reciprocatable means in the opposite direction. With this type of arrangement the dogs for the tripping lever have had to be spaced apart relatively wide lengths of said reciprocatable means and moved the entire reciprocating amount of said reciprocable means. Thus whenever it has been desired to adjust the dogs to adjust the length of the reciprocation of the reciprocatable means it has been necessary to stop the machine and for the operative to travel substantially the length of the machine to adjust the dogs to the desired position. An object of my invention is to provide a supplemental reciprocatable slide or member of much lesser length and of much lesser reciprocating movement than that of the reciprocatable means, to connect the same to the reciprocatable means by means of a reducing gearing and to mount the dogs directly on said reciproctable slide with the result that adjustable dogs may be provided adjustable within the normal reach of an operative in his normal operating position without having to travel up and down the length of the machine to adjust the desired reciprocating amount of said machine. I thus am enabled to provide a device in which the hitherto troublesome adjustment of the reciprocable means may be made readily and easily by the operative without stopping the machine for any length of time.

A further feature of my invention relates to the construction of a machine tool of this description by providing the reducing gearing within or underneath a trough underneath the rotating tool so that a splash trough may be provided directly underneath the rotating tool without interfering with the action of the adjustable dogs in actuating the trip lever to reciprocate the reciprocatable means.

These and such other objects of my invention as may hereinafter appear will be best understood from a description of an embodiment thereof such as is shown in the accompanying drawings.

In the drawings, Fig. 1 is a perspective view of a grinding machine equipped with my invention.

Fig. 2 is an enlarged view of a portion of the front portion thereof showing the trip lever and adjustable dogs mounted on the reciprocatable slide.

Fig. 3 is a sectional view taken along the broken line 3—3 of Fig. 2.

Figure 1:
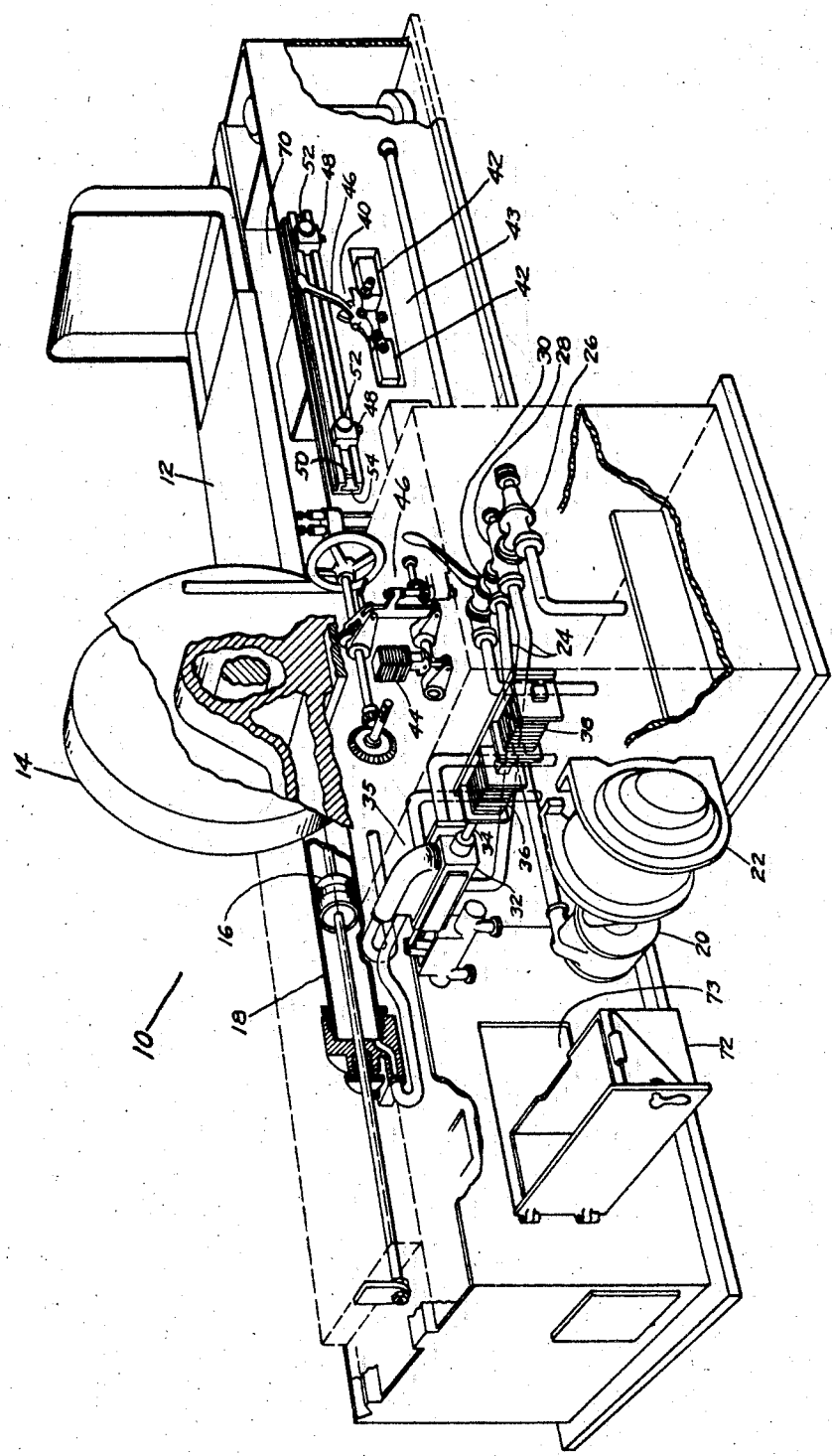

In the drawings, wherein like characters of reference indicate like parts throughout, 10 generally indicates a grinding machine constructed in accordance with the principles of my invention. This machine is of the type shown and claimed in the joint application of myself, George T. Huxford, and Paul G. Heinemann, filed June 13, 1931, Ser. No. 544,122. Further reference is made to said specification for details of the description thereof. Said machine includes the work holding table 12 and a rotatable grinding wheel 14 mounted to contact and grind work mounted on said table 12. In this embodiment the table 12 is reciprocated by means of the actuating piston 16 reciprocatable in the actuating cylinder 18 by the type of mixed fluid pressure and electrical control system shown in said application. The fluid pump 20 driven by the motor 22 circulates the fluid through the circulating pipes 24 to alternately push the piston 16 to the right to pull the table to the right and push the piston to the left to drive the table to the left, said system being provided with the usual pressure relief valve 26, speed adjusting valve 28 and bypass 30 described in more detail in said application. The slidable valve 32 changes the direction of circulation in said pipes 24 so as to reverse the movement of the piston 16. The slidable valve 32 includes the slidable piston actuated by the piston rod 34 actuated by the oppositely disposed solenoids 36 and 38 suitably controlled by a suitable electric system controlled by the position of the trip lever 40, which actuates the contact switches 42 in said system. The tool is fed forward the desired amount by the solenoid 44 connected in series with said solenoids 36 and 38 and feeds through the mechanism 46 described in detail in said patent said tool forward relative amounts at the end of each table reciprocation. The trip lever 40 may actuate the electric switches 42 or any suitable type of hydraulic valve or other mechanical control to thus control the reciprocation of the table. Said trip lever 40 is provided with the trip arm 46.

As stated hitherto my invention specifically includes the means I preferably employ for controlling the adjustment of the dogs 48 which are usually mounted right on the side of the reciprocatable table 12 and are adjustable along the entire length thereof thus requiring whenever it is desired to change the length of the reciprocation thereof an operative to travel a considerable distance up and down the machine for this purpose. I have so designed the machine that the position of the dogs may be readily adjusted right within the ready reach of an operative. As stated hitherto, the trip lever 40 including the trip arm 46 is mounted on said machine to be operative on movement in one direction to actuate said reciprocating means including the piston 16 within the cylinder 18 to move said table 12 in one direction and operative on movement in the opposite direction to actuate said reciprocating means to move the table in the opposite direction. To reduce the necessary movement of the table I preferably provide the reciprocating slide 50 mounted on said machine of a much less length than that of the table. The adjustable dogs 48 are mounted on the front of said slide 50 and are preferably provided with the thumb screws 52 adjustable within the groove 54 in the slide 50 for this purpose and it is obvious that they may be adjusted within said groove at the desired intervals to actuate said trip lever to move said reciprocating mechanism in a manner to reciprocate the table the desired amount. The slide 50 is preferably so short that the dogs 48 may be adjustable on said slide within the normal reach of an operative in his normal operating position. To reduce the movement of said slide 50 relative to said table 12 as shown in Fig. 3 I provide the reducing gearing 56.

In the embodiment shown said reducing gearing includes the rack 58 mounted underneath said table 12 to move therewith which actuates the pinion 60 mounted on the shaft 62 on which revolves the much reduced pinion 64. Said pinion 64 actuates the pinion 66 which in turn drives the rack 68 on the rear end of said slide 50.

A further feature of my invention relates to the fact that said reducing gearing may be so positioned as to provide a coolant receiving trough on the surface of the reciprocating table, namely, the coolant receiving trough 70 in front of said table underneath said tool 14. The slide 50 may be mounted on said machine in front of said trough 70. By spacing the table apart from the mechanism 50 on which the dogs are mounted I am enabled to provide a highly desirable coolant trough for the reception of coolant underneath the tool which may receive the splashing coolant as the table reciprocates relative thereto and the reduction gearing 56 may be readily mounted as shown in said trough 70. The fluid may circulate from said trough 70 through the sediment sieve 72 and thus be pumped back to be again supplied to the rotating tool in the manner described in my copending application S. N. 536,540 filed May 11, 1931 for coolant supply for machine tool.

It is thus apparent that I have provided a novel improvement in the drive for reciprocatable means of this description so as to make the adjustment of the dogs for actuating the trip lever or other means for actuating the means to reciprocate the reciprocatable means whether the same includes the electric circuit 43 shown which in turn actuates the hydraulic means 35 shown or otherwise and which may be so constructed to operate whether the work is mounted on the reciprocating member or the rotating tool thereof is mounted on the reciprocating member, or in a machine tool for the actuation of any reciprocatable means for any purpose within easy adjustable reach of an operative in his normal operative position and that by so mounting said adjustable dogs on the slide 50 spaced from said table 12 I have made it possible to provide a coolant receiving trough in a machine of this description to receive the coolant normally splashing down from the rotating tool in a trough to prevent it splashing over the surface of the reciprocating table.

It is understood that my invention is not limited to the specific embodiment shown and that various deviations may be made therefrom without departing from the spirit and scope of the appended claims.

What I claim is:

1. In a machine tool a reciprocating work holding table, a rotating grinding tool in front of said table, a coolant trough in front of said table and underneath said tool, means to reciprocate said table, a trip lever mounted on said machine operative on movement in one direction to actuate said reciprocating means to move said table in one direction and operative on movement in the opposite direction to actuate said reciprocating means to move said table in the opposite direction, a reciprocating slide mounted on said machine in front of said trough of a much less length than that of the table, dogs adjustably mounted on said slide to actuate said trip lever adjustable within the normal reach of an operative in his normal operating position, and a reduction gearing connecting said table to said slide and located within said trough.

2. In a machine tool, a reciprocating table, a tool in front of said table, a coolant trough in front of said table and underneath said tool, means to reciprocate said table, means mounted on said machine operative on movement in one direction to actuate said reciprocating means to move said table in one direction and operative on movement in the opposite direction to actuate said reciprocating means to move said table in the opposite direction, a reciprocating slide mounted on said machine in front of said trough of a much less length than that of the table, means mounted on said slide to actuate said reciprocating means actuating means, and a reduction gearing connecting said table to said slide and located within said trough.

3. In a machine tool, a reciprocating table, a tool in front of said table, means to reciprocate said table, means mounted on said machine operative on movement in one direction to actuate said reciprocating means to move said table in one direction and operative on movement in the opposite direction to actuate said reciprocating means to move said table in the opposite direction, a reciprocating slide mounted on said machine of a much less length than that of the table, means mounted on said slide to actuate said reciprocating means actuating means, and a reduction gearing connecting said table to said slide.

4. In a machine tool, a reciprocating table, a tool, a coolant trough in front of said table and underneath said tool, means to reciprocate said table, means mounted on said machine operative on movement in one direction to actuate said reciprocating means to move said table in one direction and operative on movement in the opposite direction to actuate said reciprocating means to move said table in the opposite direction, a reciprocating slide mounted on said machine in front of said trough of a much less length than that of the table, means adjustably mounted on said slide to actuate said reciprocating means actuating means, and a reduction gearing connecting said table to said slide and located within said trough.

5. In a machine tool, a reciprocating table, a tool, means to reciprocate said table, means mounted on said machine operative on movement in one direction to actuate said reciprocating means to move said table in one direction and operative on movement in the opposite direction to actuate said reciprocating means to move said table in the opposite direction, a reciprocating slide mounted on said machine of a much less length than that of the table adjustably mounted on said slide to actuate said reciprocating means actuating means adjustable within the normal reach of an operative in his normal operating position, and a reduction gearing connecting said table to said slide.

6. In a machine tool, tool means, work means, one of said means being stationarily mounted on the machine and the other being reciprocatable relative thereto, means to reciprocate said reciprocatable means, means mounted on said machine operative on movement in one direction to actuate said reciprocating means to move said reciprocatable means in one direction and operative on movement in the opposite direction to actuate said reciprocating means to move reciprocatable means in the opposite direction, a reciprocating slide mounted on said machine of a much less length than that of the reciprocatable means, means mounted on said slide to actuate said reciprocating means actuating means, and a reduction gearing connecting said reciprocatable means to said slide.

In testimony whereof I affix my signature.

FRANK E. STRATTON.